Sept. 6, 1938.  H. W. ZIMMERMAN  2,129,485
BORING MACHINE
Filed March 8, 1935  10 Sheets-Sheet 1
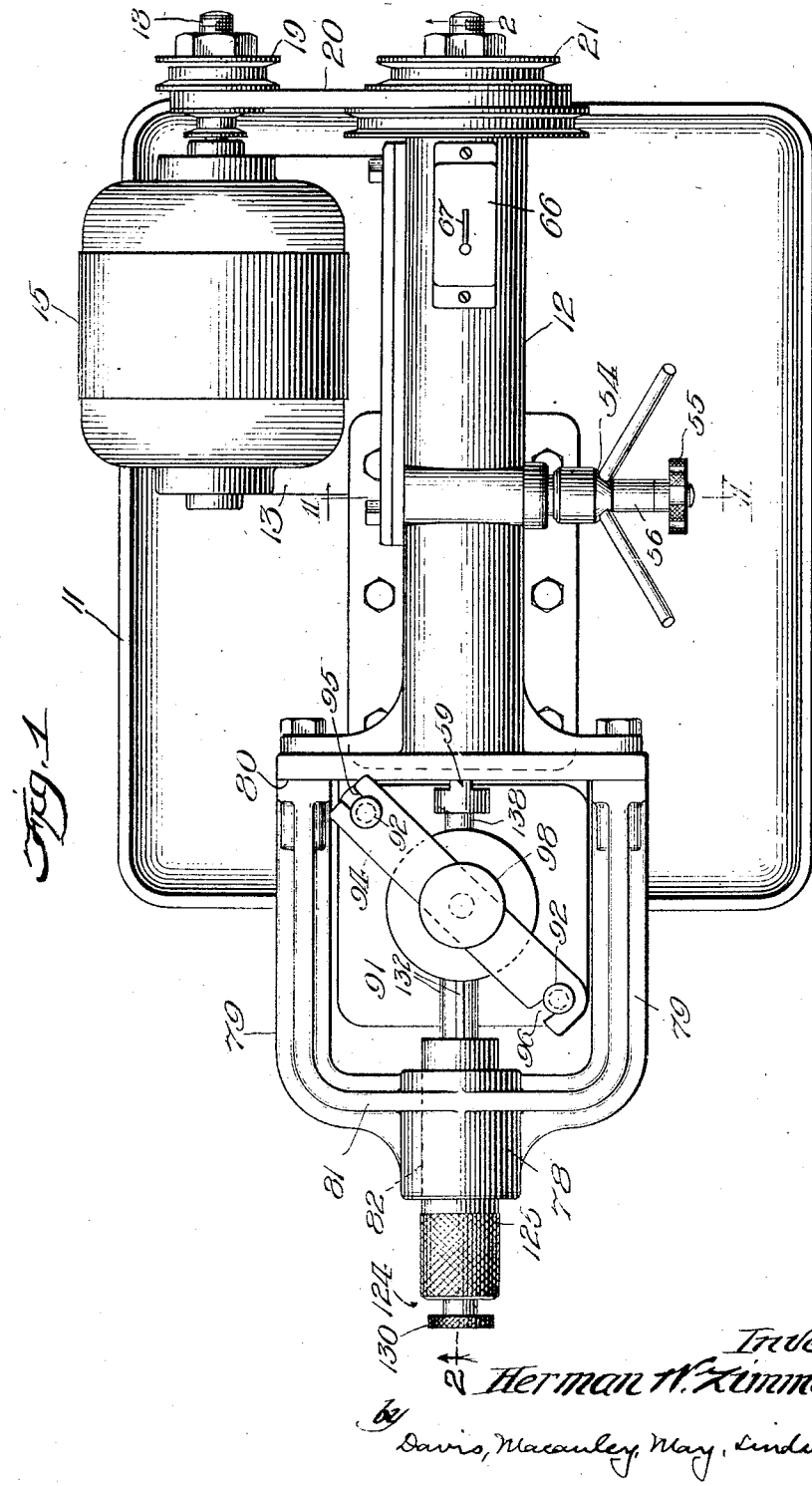

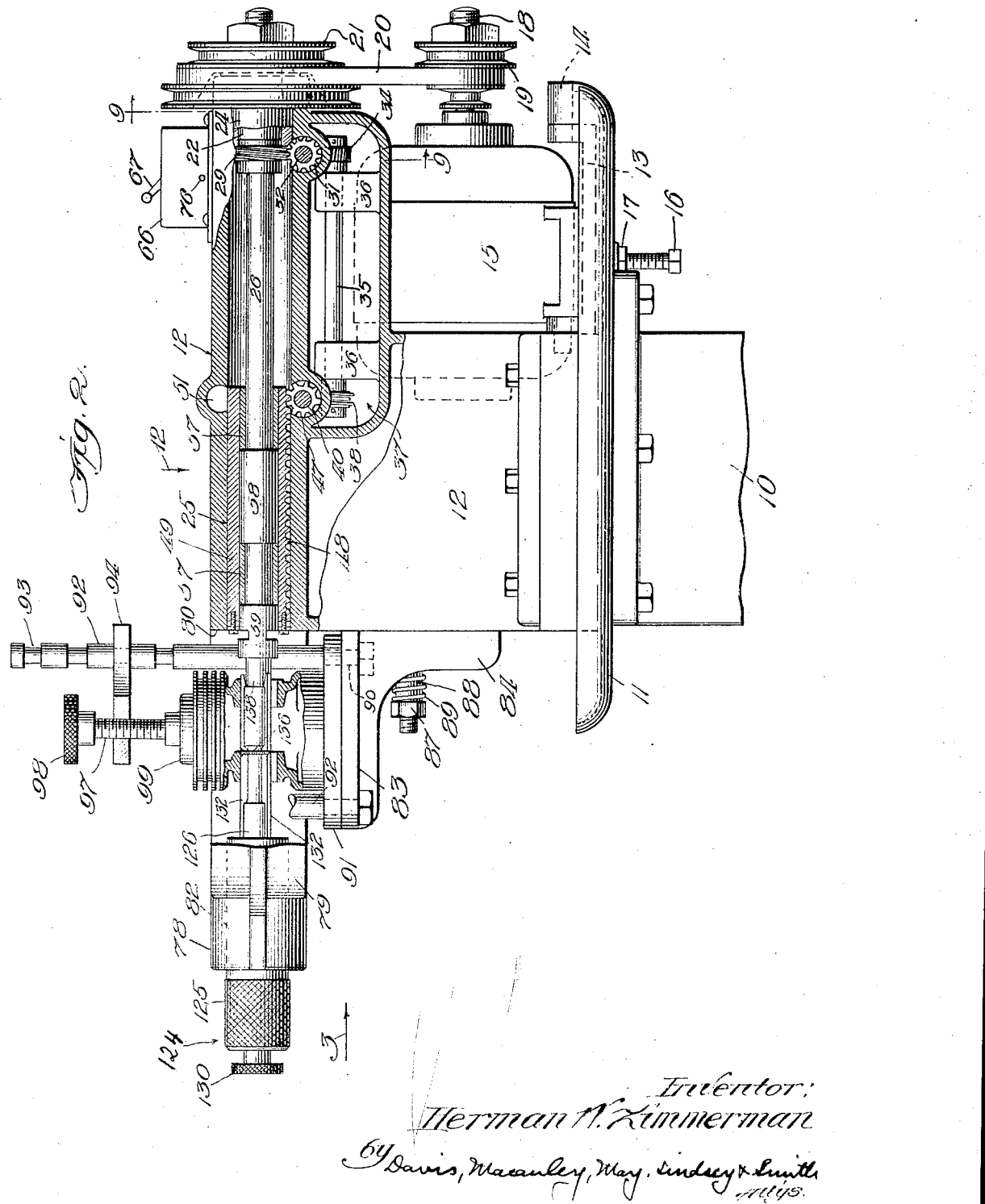

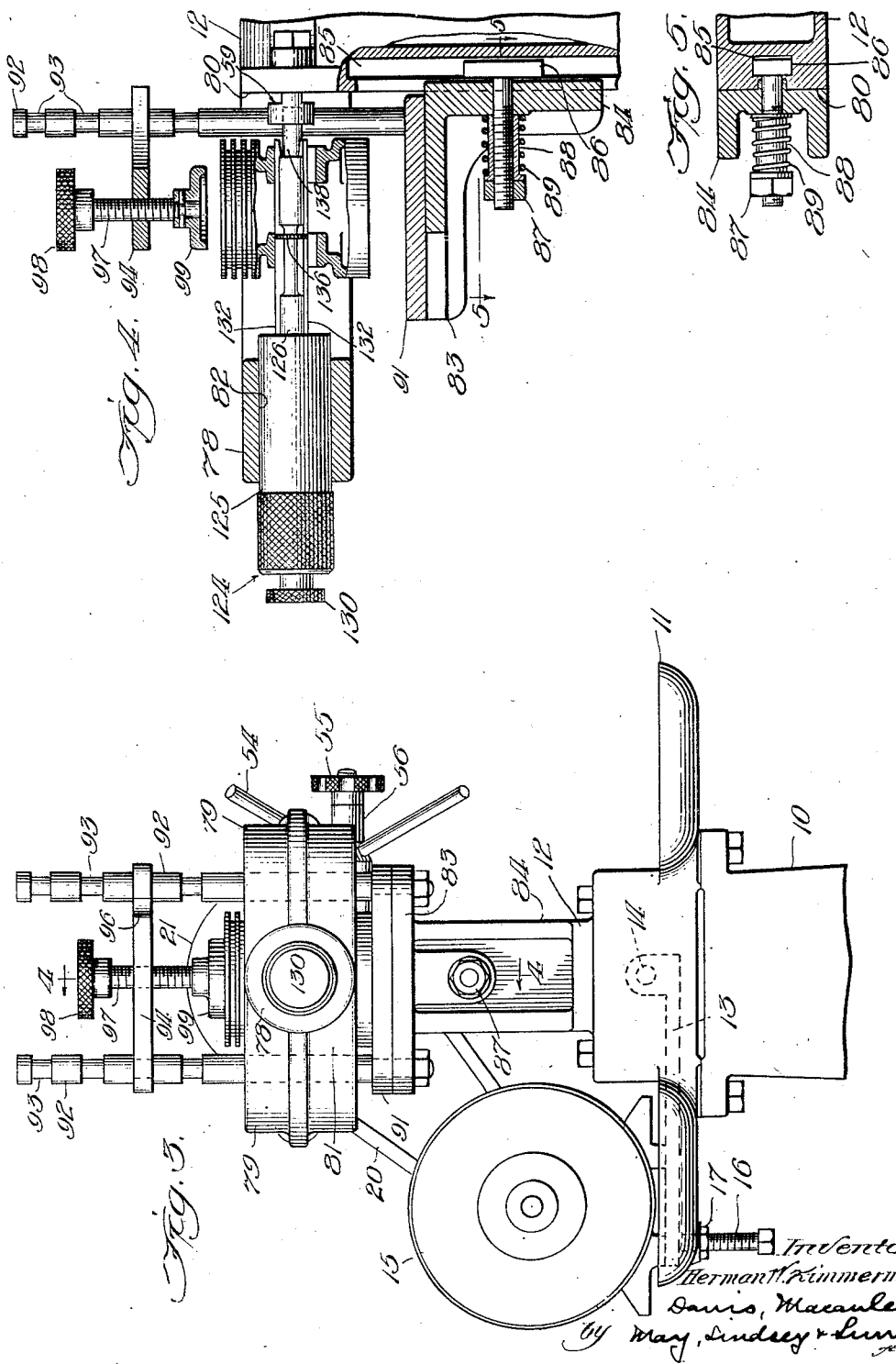

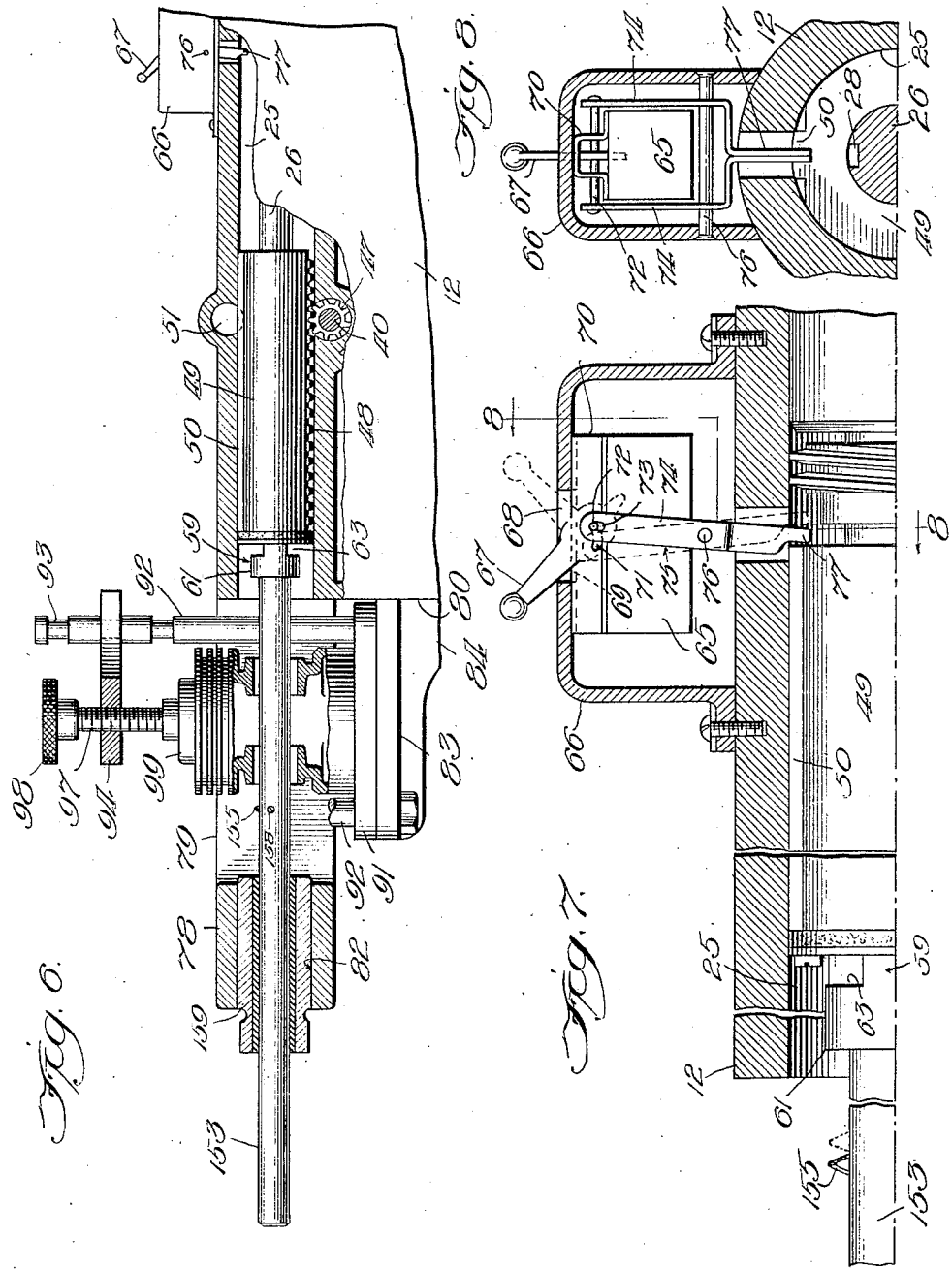

Sept. 6, 1938.　　　H. W. ZIMMERMAN　　　2,129,485
BORING MACHINE
Filed March 8, 1935　　　10 Sheets—Sheet 5
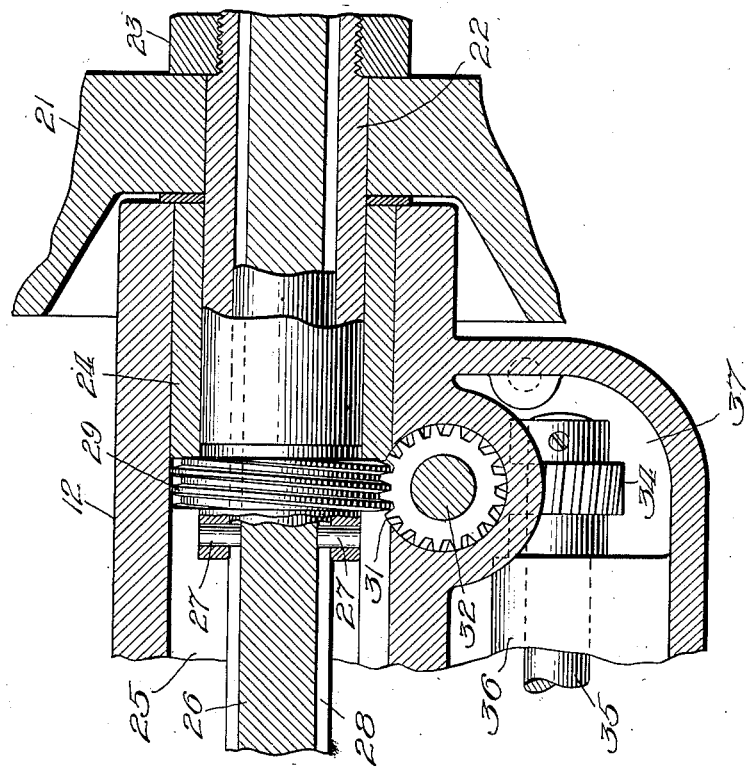
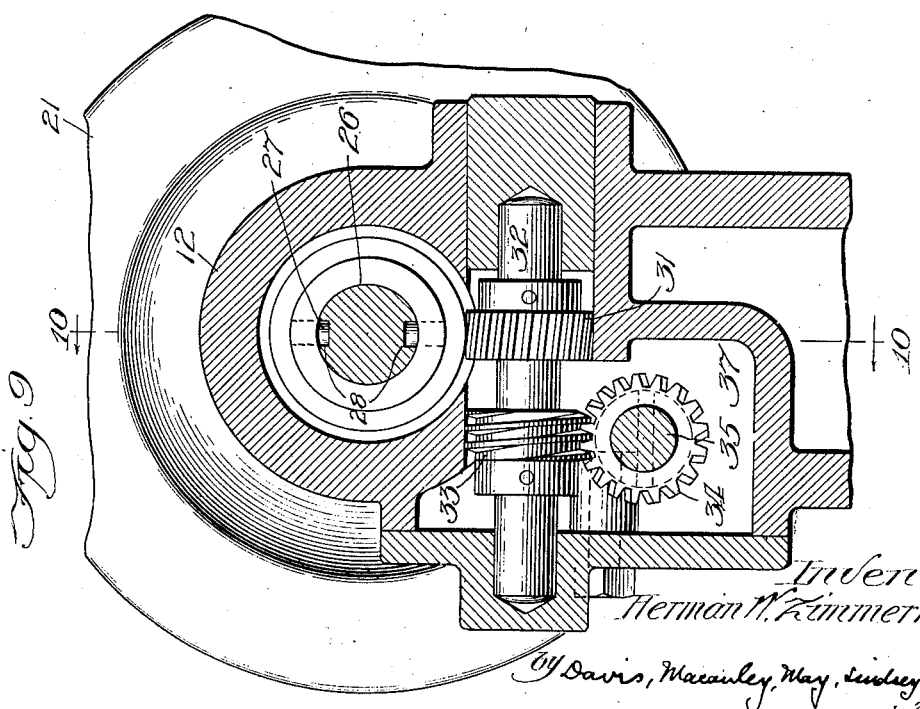

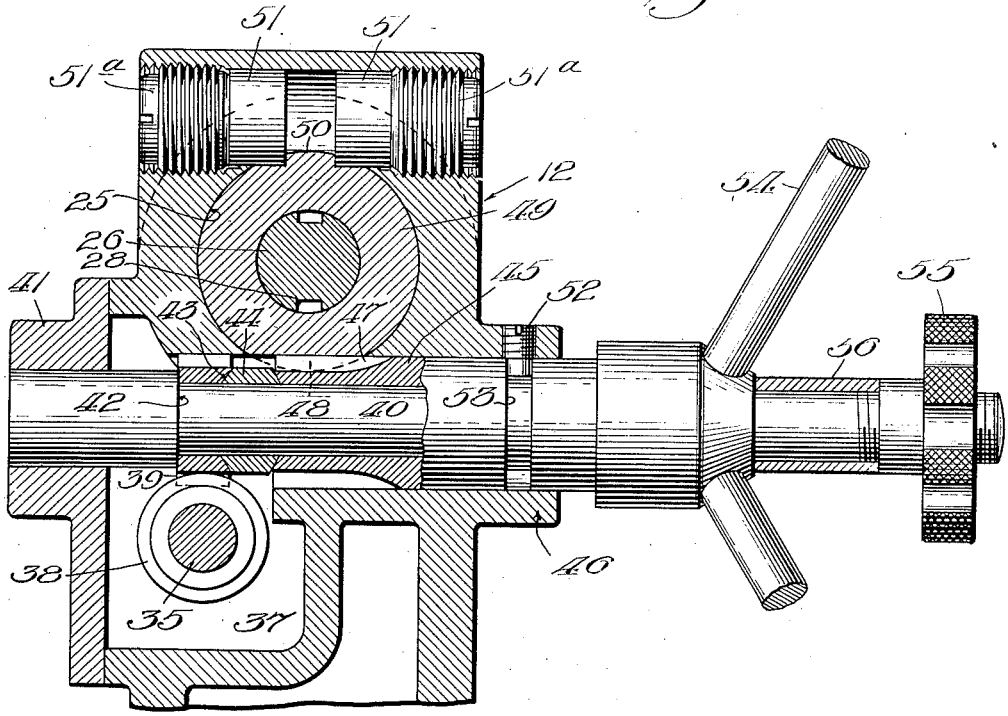
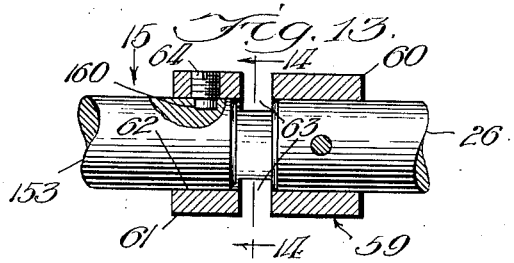
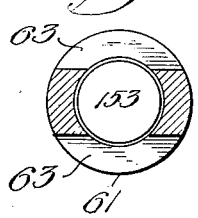
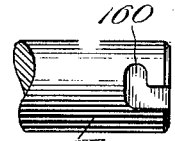

Sept. 6, 1938.   H. W. ZIMMERMAN   2,129,485
BORING MACHINE
Filed March 8, 1935    10 Sheets-Sheet 7
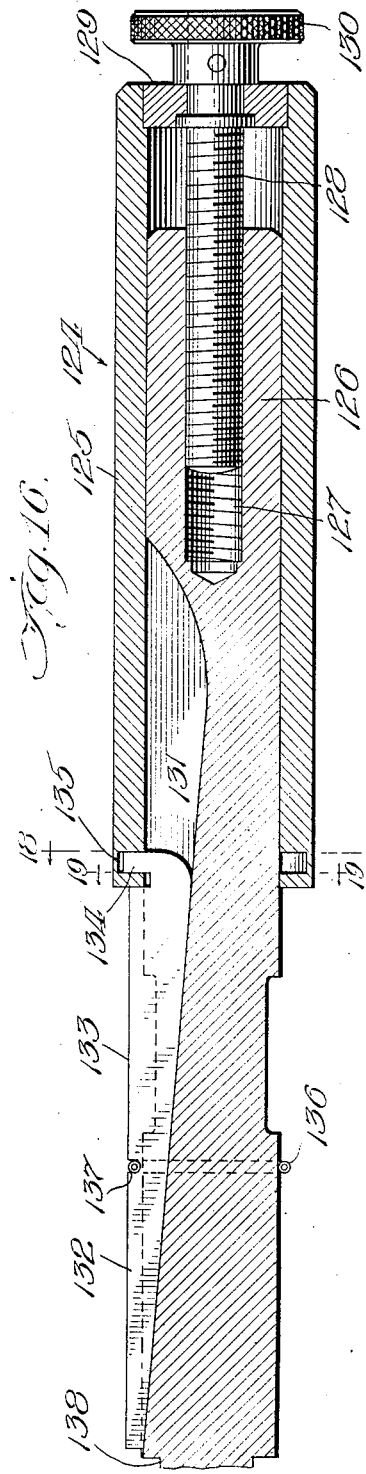
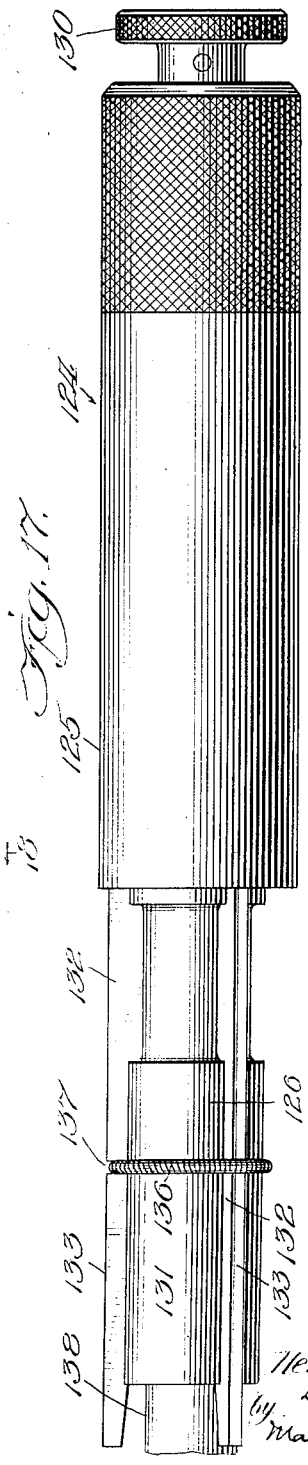
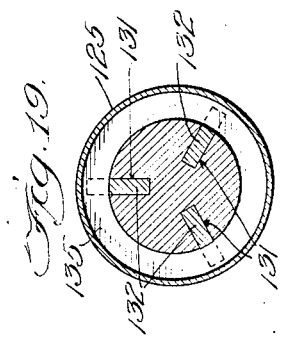
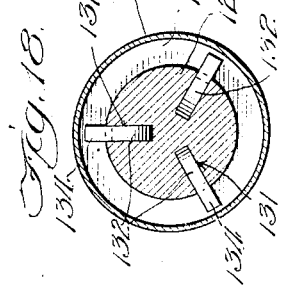

Sept. 6, 1938. H. W. ZIMMERMAN 2,129,485
BORING MACHINE
Filed March 8, 1935 10 Sheets-Sheet 8
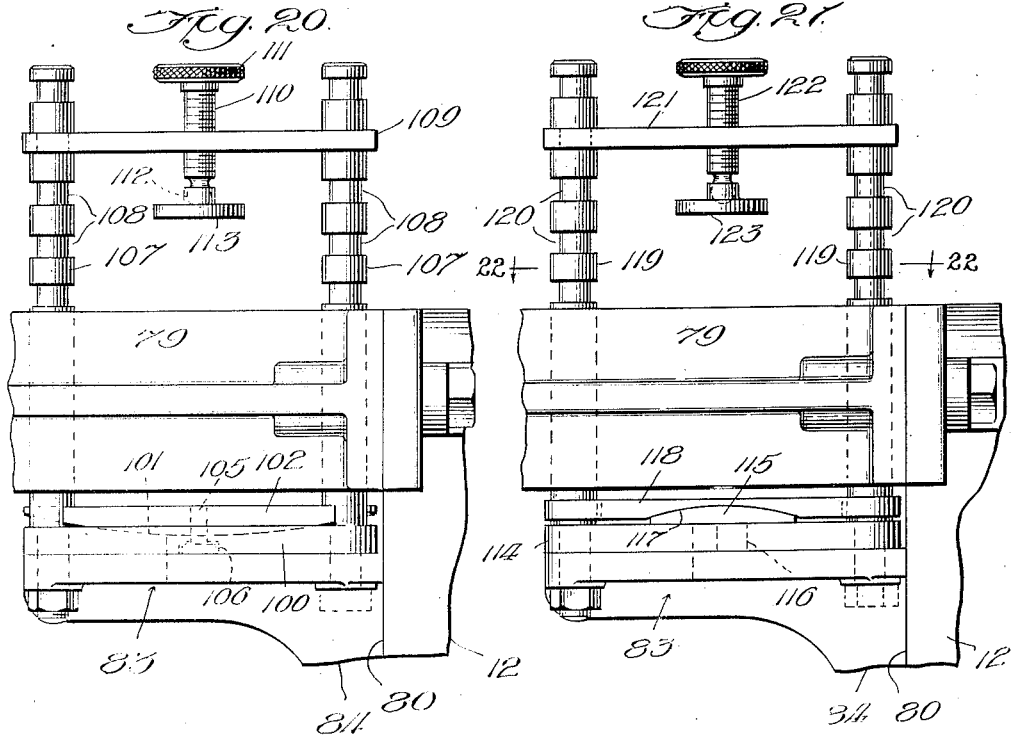
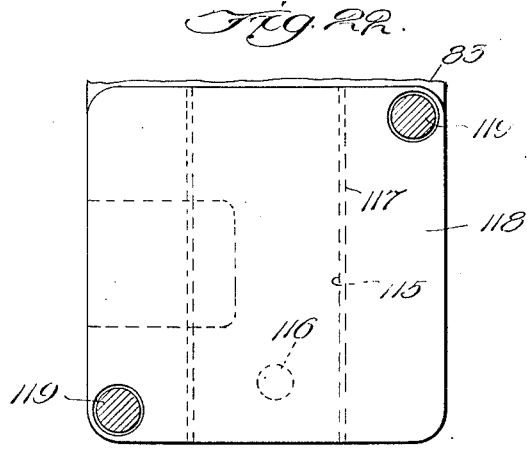
Inventor:
Herman W. Zimmerman
By Davis, Macauley, May, Lindsey & Smith
Attys.

Sept. 6, 1938.  H. W. ZIMMERMAN  2,129,485
BORING MACHINE
Filed March 8, 1935   10 Sheets-Sheet 9
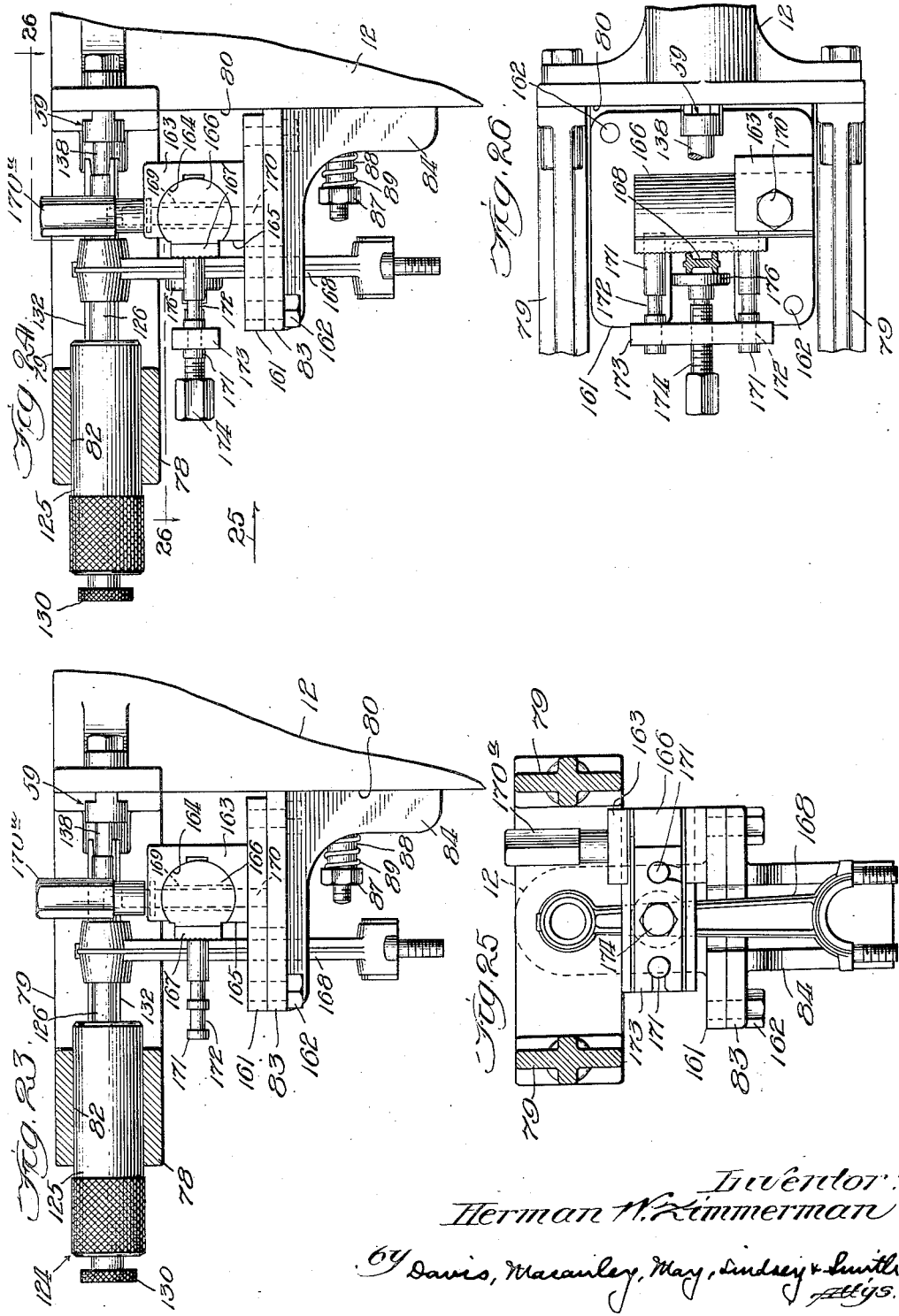

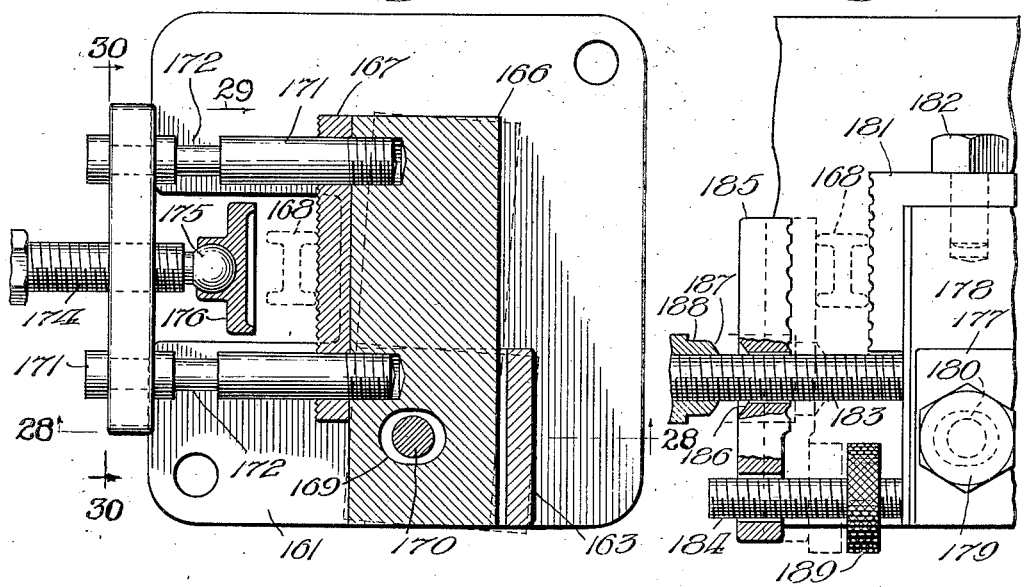
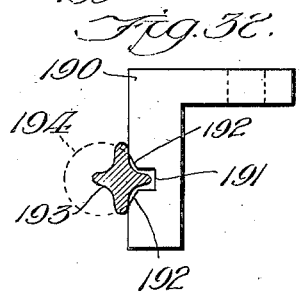
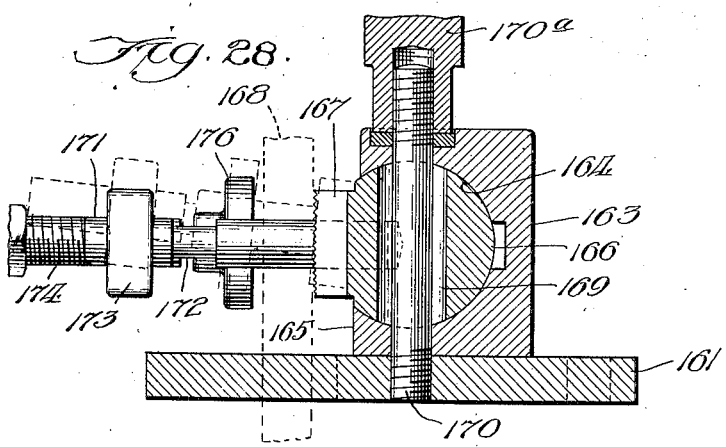
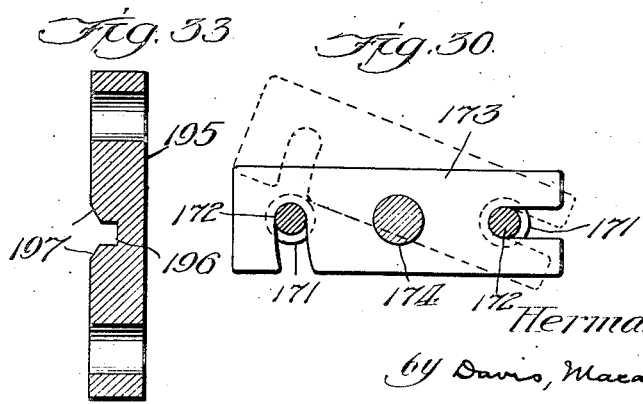

Patented Sept. 6, 1938

2,129,485

UNITED STATES PATENT OFFICE 2,129,485

BORING MACHINE

Herman W. Zimmerman, Chicago, Ill., assignor to Automotive Maintenance Machinery Co., Chicago, Ill., a corporation of Illinois Application March 8, 1935, Serial No. 9,989

5 Claims. (Cl. 77—3)

My invention relates generally to a boring machine, particularly a machine for enlarging a hole in a previously bored part, and one aspect thereof is concerned with the solution of boring problems encountered in the field of automotive repair and replacement service, including the precise fitting of piston pins.

This service differs fundamentally from the so-called production manufacture of the same parts in that, under the latter conditions, the machines are set and adjusted to work on one size of unit and there is no problem involved of centering with respect to a pin or bearing hole already formed. By contrast, in repair and replacement service, the problem presented is that of reboring previously bored holes in pistons and connecting rods, that from job to job, differ in size, shape and condition. For example, a job of boring pin holes in a 3½" piston may be immediately followed by a similar job for a 3" piston and so on through the work day. Labor and machine costs are a paramount factor in this service and these can only be reduced by methods which approximate the rapidity and precision of factory production.

Present and previous methods of enlarging holes of the type under discussion involve generally the use of expansion reamers or hones. It is extremely difficult to accurately set reamers to the size desired and, moreover, the reaming operation is slow and therefore high in labor cost. Reamed holes are inaccurate and are generally characterized by ridges which not only provide poor bearing surfaces, but wear down rapidly in service. Besides, with a single setting of the reamer, a full set of pistons, for example, cannot be reamed with any assurance that the holes in the several pistons will be of the same size. Expansion reamers are costly tools to maintain and replace, are frequently injured by hard spots in the material worked on, and are not uniformly effective on different kinds of materials usually encountered in this type of work.

In general, the honing method is subject to the same objections, particularly as regards the non-uniformity of holes in a set of pistons or connecting rods, and the high cost of keeping the honing tool in effective working condition. The so-called "bell-mouth" holes are frequently produced by this method which provide an insufficient bearing surface for the pin.

Finally, both the reamer and hone methods are characterized by the same operating objection, namely, an inability to precisely center the enlarged hole with respect to the old hole. Failure to secure this result means that when the rods and pistons are assembled in the cylinders, the original relationship between the rods and pistons and/or the pistons and cylinders will be disturbed, thus causing undue strains in the assembly, excessive bearing pressures at certain points, and a generally unsatisfactory operating condition.

It is therefore one object of my invention to devise a boring machine for enlarging holes in parts generally wherein the axis of the hole then in the part is precisely aligned with respect to the axis of an enlarging tool, more particularly a boring bar, after which the hole is enlarged by a true boring operation to produce a hole that is straight and circular throughout its length and that is precisely centered relative to the old hole.

A further object is to devise a machine as above indicated in which the bearing holes in a set of pistons or connecting rods may be enlarged with positive assurance of uniformity and precision in size as between different pistons and rods.

A further object is to provide a machine for reboring previously bored bearing holes in pistons and connecting rods in which the part worked on is held so that the axis of the old hole is definitely located in precise alignment with the axis of the boring tool and positively held in this position during the boring operation.

A further object is to devise a machine of the character indicated having detachable fixtures adapted for association therewith for clamping in position the part having the hole to be enlarged, the clamping members having a universal movement for accommodation to the part.

A further object is to provide a machine as above set forth which utilizes a boring bar provided with a single point tool which bores true, round, straight holes having a mirror finish into which the parts may be immediately inserted without any necessity for further fitting, and which is easy to operate, quickly set up for operation, characterized by low maintenance cost, and which rebores bearing holes on substantially a production basis in cast iron, bronze, alloy metals, brass or aluminum.

These and further objects of my invention will be set forth in the following specification, reference being had to the accompanying drawings, and the novel means by which said objects are effectuated will be definitely pointed out in the claims.

In the drawings:

Figure 1 is a plan view of my improved boring machine.

Fig. 2 is a section along the line 2—2 in Fig. 1, looking in the direction of the arrows, showing the driving mechanism for the boring spindle and the piston in process of having its pin hole centered with respect to the axis of the boring spindle.

Fig. 3 is an end view of the machine, as viewed in the direction of the arrow 3 in Fig. 2.

Fig. 4 is a section along the line 4—4 in Fig. 3, looking in the direction of the arrows, showing the work table which is adjusted along the end face of the boring head of the machine and a piston supported on the centering head prior to being clamped in centered position.

Fig. 5 is a section along the line 5—5 in Fig. 4, looking in the direction of the arrows.

Fig. 6 is a sectional elevation, corresponding to a portion of the machine, as illustrated in Fig. 2, the boring bar being substituted for the centering head.

Fig. 7 is an enlarged sectional elevation of the upper, right hand end of the machine, as viewed in Fig. 2, showing the switch for controlling the operation of the motor that drives the machine, and the connection with the boring spindle which automatically shuts off a switch when the spindle reaches the end of its travel.

Fig. 8 is a section along the line 8—8 in Fig. 7, looking in the direction of the arrows.

Fig. 9 is an enlarged section along the line 9—9 in Fig. 2, looking in the direction of the arrows, and showing a portion of the driving mechanism for the boring spindle.

Fig. 10 is a section along the line 10—10 in Fig. 9, looking in the direction of the arrows.

Fig. 11 is an enlarged section along the line 11—11 in Fig. 1, looking in the direction of the arrows, and showing the manner of establishing and interrupting the connection between the boring spindle and the driving mechanism.

Fig. 12 is a plan view of the boring spindle, as viewed in the direction of the arrow 12 in Fig. 2.

Fig. 13 is an enlarged section of the chuck end of the boring spindle, taken along the line 13—13 in Fig. 12 and looking in the direction of the arrows.

Fig. 14 is a section along the line 14—14 in Fig. 13, looking in the direction of the arrows, and showing the opening in the spindle chuck through which dirt, chips and the like are expelled when either the centering head or the boring bar, both hereinafter described, are inserted in the chuck.

Fig. 15 is a plan view of the end of the boring bar shown in Fig. 13, looking in the direction of the arrow 15 in said figure.

Fig. 16 is an enlarged, sectional elevation of the centering head which is employed to precisely align the axes of the previously bored holes in a piston or connecting rod with the axis of the boring spindle, the radial blades of the head being shown in partially retracted position.

Fig. 17 is an elevation of the centering head showing the radial, work-contacting blades in expanded position.

Figs. 18 and 19 are sections along the lines 18—18 and 19—19 in Fig. 16, looking in the direction of the arrows.

Fig. 20 is an elevation of a modified type of piston holding fixture in which the clamp members thereof are capacitated for universal movement and which may be substituted for the type of fixture shown in Fig. 2.

Fig. 21 is an elevation of a further modification of a piston holding fixture in which the upper clamp member is adapted for a full universal movement, while the lower clamping member is capable of a rocking movement in one plane only.

Fig. 22 is a section along the line 22—22 in Fig. 21, looking in the direction of the arrows.

Fig. 23 is an elevation, partly in section, of the left end of the machine, as viewed in Fig. 2, but showing a connecting rod in process of having the axis of its piston pin hole aligned with the axis of the boring spindle, and also showing one type of connecting rod holding fixture, one of the clamps being omitted.

Fig. 24 is a view similar to Fig. 23, showing a succeeding step in the centering of the connecting rod and the clamping of the rod in the centered position.

Fig. 25 is an end view of so much of the machine as is shown in Fig. 24, looking in the direction of the arrow 25 in said figure, the outboard bearing being omitted.

Fig. 26 is a section along the line 26—26 in Fig. 24, looking in the direction of the arrows.

Fig. 27 is an enlarged view, similar to that shown in Fig. 26, but showing an intermediate step in the clamping of the connecting rod in centered position and further illustrating the universal movements of the clamping members of the rod holding fixture.

Fig. 28 is a section along the line 28—28 in Fig. 27, looking in the direction of the arrows.

Fig. 29 is a face view of one of the clamp plates in Fig. 27, looking in the direction of the arrow 29 in said figure.

Fig. 30 is a section along the line 30—30 in Fig. 27, looking in the direction of the arrows and showing the swing mounting of the bridge which carries one of the clamps.

Fig. 31 is a plan view, partly in section, of a modified rod holding fixture.

Fig. 32 is a plan view of a modified clamp member which may be associated with the fixture shown in Fig. 31 and which is shaped and arranged to properly clamp a connecting rod having a shank which is cross-shaped or circular in section.

Fig. 33 is a sectional elevation of a further modification of a clamping plate which may be substituted for the plate shown in Fig. 27 and which is provided with a groove on one face for properly engaging a connecting rod having either a circular or a cross-shaped cross section.

Referring to Figs. 1 to 10, inclusive, the numeral 10 designates the base of my improved machine which is provided at some convenient height from the floor with a tool pan 11 that may completely encircle the machine, and a boring or work head 12 is bolted to the upper face of this tool pan. A swingable motor bracket 13 is pivoted as at 14 on the tool pan and extends outwardly from the machine to receive the base of a motor 15. The underside of the bracket 13 rests on the upper end of an adjusting screw 16 which is threaded in and projects through the pan 11 and which may be locked in any predetermined position by a lock nut 17. Accordingly, the motor bracket may be swung in vertical position in order to place any desired tension on the driving belt, as hereinafter described, and in order to accommodate the belt and motor to the several speeds as provided by the driving and driven pulleys, also as hereinafter described.

The motor driving shaft 18 has affixed thereto a driving pulley 19 which is generally of the cone type and which may be provided with the multi-speed stages as shown in Fig. 2. A driving belt 20 operates over the pulley 19 and also over a driven pulley 21, that is similarly but reversely arranged to the pulley 19.

Referring more particularly to Figs. 9 and 10, the pulley 21 is clamped upon the end of a sleeve 22 by means of a nut 23 and this sleeve is rotatably supported in a bearing 24 mounted in one end of a bore 25 provided in the boring head 12. The machining of the bore 25 is important and it is bored and honed absolutely straight and round throughout its length and all other machining of the boring head casting is effected from this hole.

The pulley sleeve 22 is drivably connected to one end of a boring spindle 26 by means of a pair of driving keys 27 that are disposed on opposite sides of the boring spindle and which fit into keyways 28 provided in the latter part. The fitting of the keys 27 in the boring spindle is such that, while the spindle rotates with the pulley 21, it is nevertheless capacitated for an endwise movement in the sleeve 22, for a purpose presently explained.

A worm gear 29 is also drivably connected to the spindle 26 through the medium of a pair of oppositely disposed driving pins 27 that are mounted in the hub of the gear and which project into the keyways 28. The worm 29 meshes with a worm gear 31 that is pinned to a stub shaft 32 rotatably supported in the boring head below the spindle 26. A worm 33 is also pinned to the shaft 32 in offset relation to the worm gear 31 and meshes with a worm gear 34 that is pinned to a shaft 35.

Referring to Fig. 2, it will be noted that the worm gear 34 is mounted on one extremity of the shaft 35 which is rotatably supported in a pair of spaced bearings 36 that extend upwardly from the floor of a cavity 37 provided in the boring head 12 below the boring spindle. The other extremity of the shaft 35 has pinned thereto a worm 38 which meshes with a worm gear 39 (see Fig. 11) that is freely mounted on a feed control shaft 40 that extends transversely across the boring head below the boring spindle and at one end is journaled in a bearing 41 provided on the head. The portion of the shaft 40 within the journal 41 is enlarged to provide a shoulder 42 that abuts against the adjacent side face of the worm gear 39. The opposite side face of the gear 39 is inwardly beveled to provide a friction surface 43 for cooperation with a similarly shaped surface provided on a friction sleeve 44 that is also loosely mounted on the shaft 40. The opposite side of the sleeve 44 is similarly shaped for coaction with a like arranged, inwardly beveled surface provided on the end of a sleeve 45 that is journaled in a bearing 46 provided in the boring head. The end of the sleeve 45 adjacent the friction sleeve 44 is arranged as a gear 47 which meshes with a rack 48 provided on the underside of a sleeve 49 that has a sliding fit in the bore 25. The upper side of the sleeve 49 is provided with a longitudinal fin 50 that is engaged on opposite sides by plugs 51 that are mounted in the boring head and held in position by threaded plugs 51ª. Accordingly, the sleeve 49 is adapted for a free sliding movement within the bore 25, but is definitely held against rotation by means of the interaction of the fin 50 and plugs 51.

The sleeve 45 extends beyond the end of the journal 46 and is held against endwise movement with respect thereto by means of a set screw 52 that is threaded in the journal and whose inner end fits into an annular groove 53 provided in the sleeve. The outer end of this sleeve has affixed thereto a hand wheel 54.

The feed control shaft 40 extends beyond the hand wheel 54 and has threaded on the end thereof a finger knob 55 which is spaced from the hand wheel by means of a sleeve 56 that encircles the shaft 40.

From the foregoing construction, it will be evident that, when the hand knob 55 is backed off along the shaft 40, the shaft 40, gear 39 and friction sleeve 44 will so accommodate themselves that driving connection between the gears 38 and 47 will be broken, but that, when the knob is tightened, the shaft 40 will be shifted endwise towards the right, as viewed in Fig. 11, to thereby establish a frictional drive between the cooperating surfaces of the friction sleeve 44 and the gears 39 and 47, respectively. When the hand knob is in back-off position, the hand wheel 54 may be rotated manually to move the sleeve 49 endwise within the bore 25, but when the knob is tightened, the sleeve 49 is positively moved by power derived from the motor operating through the gear mechanism above described.

The boring spindle 26 extends completely through the sleeve 49 and is supported therein by means of bearings 57 that are located on opposite sides of and abut against the ends of an intermediate enlarged portion 58 provided on the spindle. Therefore, as the sleeve 49 is moved endwise in the bore 25, the spindle will also partake of this movement, but at the same time rotating within the sleeve, if power connection to the motor is established.

In Figs. 12 to 14, inclusive, is illustrated in detail the working end of the spindle 26. This end of the spindle 26 is provided with a dirt free chuck 59 which includes a sleeve 60 that is pinned to the end of the spindle and which is provided with a chuck part 61 that extends beyond the end of the spindle. The chuck part 61 is provided with a socket 62 for receiving one end of the boring bar, hereinafter described, and a pair of slots 63 are milled on opposite sides of the axis of the sleeve 60 just beyond the left end of the boring spindle, which slots provide a means of communication between the socket 62 and the exterior of the sleeve, such that when the boring bar is inserted in the socket, such movement will effect an evacuation of any dirt and chips that may be in the socket outwardly through the slots 63. The chuck part 61 is also provided with a set screw 64 having an inwardly projecting head for driving engagement with a bayonet slot, hereinafter described, provided on the end of the boring bar, whereby driving connection is effected between the boring spindle and the boring bar.

Referring to Figs. 7 and 8, the operation of the motor 15 is controlled by a switch, represented generically by the numeral 65, which is carried within a casing 66 provided on the top of the boring head. The switch is operated by a handle 67 which extends upwardly through an elongated slot 68 provided in the casing and downwardly through a similar slot 69 provided in the horizontal portion of an inverted U-shaped bracket 70 that is secured to the top of the switch. The side walls of this bracket are each provided with an arcuate slot 71 and extending through these slots and the handle 67 is a pin 72 whose extremities are received within elongated slots 73 provided in the spaced ends 74 of a lever 75 that is pivoted on a pin 76 bridged between the walls of the casing. The lower end of the lever 75 is formed as a nose 77 which is adapted to be engaged by the inner end of the sleeve 49 when the latter has reached the end of its travel towards the right, as viewed in Fig. 7. When the sleeve reaches this position, the arm 77 moves the switch lever 67 to an "off" position. Accordingly, when the boring operation is completed, as hereinafter described, the motor is automatically thrown out of operation, so that there is no danger of jamming the spindle in the boring head.

In order to accurately support the centering head during the centering of the pistons and connecting rods and the boring bar during the boring operation, both as hereinafter described, the machine is provided with an outboard bearing 78 (see Figs. 1, 2, and 3) which is in the form of a U-shaped bracket whose arms 79 are bolted and doweled to the end face 80 of the boring head. The connecting part 81 which is bridged between the arms 79 is provided with a bore 82 whose axis is accurately aligned with the axis of the bore 25 in the boring head. In order to insure the accomplishment of this result, the bore 82 is machined using the bore 25 as a guide.

After the centering operation has been concluded, it is important that means be provided for definitely holding the piston or the connecting rod in the precisely centered position and this result is accomplished by means of suitably designed fixtures which are carried singly on a work table 83 having generally the cross section of an angle iron and one of whose arms 84 is vertically disposed and adapted to slide along the end face 80 of the boring head. This end face is provided with a vertical groove 85 within which slides the head of a T-bolt 86 whose stem extends outwardly through the arm 84 and has threaded on the end thereof a nut 87. A sleeve 88 encircles the stem of the bolt between the arm 84 and the nut 87 and a coil spring 89 encircles the sleeve. By this construction, it is possible to set up any desired tension in the spring 89 whereby the work table 83 may be moved along the end face 80 and held in any desired position to which it has been moved by the spring 89. The horizontal arm of the work table is provided with a pair of apertures 90 for receiving the bolts or uprights of the piston and connecting rod fixtures.

One type of piston holding fixture is illustrated in Figs. 1 to 4, inclusive, and it comprises a base plate 91 which rests on the work table 83 and a pair of diagonally disposed standards 92 which are located on opposite sides of the axes of the boring spindle and whose lower ends are reduced in diameter for insertion through the plate 91 and the work table 83. The lower ends of these standards have nuts mounted thereon to secure the fixture in position on the table. The upper portions of the standards are provided with a plurality of spaced, reduced portions 93 and a bridge bar 94 extends between these standards, one end of the bar being provided with a slot 95 which extends along the longitudinal axis of the bar and which is intended to fit one of the reduced portions 93, while the opposite end of the bar is provided with a similar slot 96 that opens toward one side edge of the bar and which is also intended to receive one of the reduced standard portions 93. The bridge bar 94 may accordingly be swung on that standard which is engaged by the walls of the groove 95. A threaded stem 97 is threaded through the central portion of the bar 94 and the upper end thereof is provided with a hand knob 98 while the lower portion below the bar is provided with a clamp 99 which is intended to engage the top of the piston, the bottom or skirt edge of the piston resting on the top surface of the plate 91. The precise method of utilizing this fixture in connection with the centering operation will be described more particularly hereinafter, but it may be noted at the present juncture that, when this type of piston holding fixture is employed, it is necessary to accurately machine the end face 80 of the boring head so that it is precisely at right angles to the axis of the boring spindle.

A modification of the piston holding fixture is illustrated in elevation in Fig. 20 and it differs essentially from the type just described in that the clamping portions of the fixture are characterized by universal movements, so that no particular precision in the machining of the end face 80 is required.

As in the first type, this modification includes a base plate 100 which is intended to rest upon the work table 83 and which is provided on its upper face with a parti-spherical depression 101. Resting in this depression is a clamp plate 102 whose upper surface is flat and whose lower surface is formed as a part sphere, for fitting in the depression 101 so that the clamp plate is adapted for a rocking or shifting movement. The plate 102 is permanently connected to the plate 100 by means of a pin whose enlarged head is loosely received within a pocket 106 formed in the plate 100. The plate 100 is generally square in marginal outline and a pair of standards 107 are located at a pair of the opposite corners thereof, the lower ends of these standards being reduced in diameter and extending through the plate 100 for securing to the work table 83 as before. These standards are also provided with spaced, reduced portions 108 for receiving the ends of a bridge bar 109, through whose central portion extends a central stem 110. The upper end of this stem above the bar has connected thereto a knurled knob 111, while the lower end of the stem below the bar is ball shaped as at 112, and fixed within the correspondingly shaped socket provided in a clamp 113. The clamp 113 is permanently retained on the ball 112, so that by the use of this fixture, the upper and lower clamp plates may easily accommodate themselves to any inequalities in the head and bottom of the piston.

In Fig. 21 is shown a further modification which is also characterized by top and bottom clamps which are adapted for universal movement. In this form, there is a base plate 114 which is intended to rest on the work table 83 and which is provided on its upper surface with a shim plate 115 which extends across the width of the plate 114 and is pivoted at one end thereto by pin 116 which extends downwardly into the plate 114. The under surface of the shim 115 is flat, while the upper surface is parti-cylindrical in shape in a direction at right angles to the length of the shim plate. This curved surface of the shim plate fits into a correspondingly shaped depression 117 provided on the under surface of a clamp plate 118 which is intended to engage with the bottom of the piston.

As in the other type, this fixture is provided with a pair of diagonally disposed uprights 119 whose lower ends are also adapted for securement to the work table 83 and whose upper ends are provided with the reduced portions 120 which are intended to receive a bridge bar 121 that supports a threaded stem 122 whose lower end is provided with a universally movable clamp 123 similar to the clamp 113. In this type, the universal action of the lower clamp plate 118 is provided by the capacity of this plate to rock in one direction, as determined by the curvature of the shim plate 115, and to be bodily rotated in a plane at right angles thereto owing to the pivotal mounting of the shim plate 115.

One of the most important features of my improved machine is the arrangement for securing a precise alignment of the axis of the previously bored pin hole with the axis of the boring spindle of the machine. This result is accomplished by the use of the centering head 124 which is more particularly illustrated in Figs. 16 to 19, inclusive. This head comprises a sleeve 125 having an external diameter such that it will fit nicely within the bore 82 in the outboard bearing and within this sleeve is slidable a carrier bar 126. The inner end of this bar has a threaded socket 127 for receiving the threaded stem 128 of an adjusting screw which passes outwardly through a plug 129 provided in the right hand end of the sleeve 125, as viewed in Fig. 16, and the outer extremity of the stem 128 has affixed thereto a finger knob 130. Accordingly, when this knob is rotated in one direction, the carrier bar 126 will be shifted endwise in one direction in the sleeve and in the opposite direction when the knob is rotated correspondingly.

The carrier bar 126 is provided with a plurality of radially disposed channel grooves 131 which are inclined outwardly in a longitudinal direction from the sleeve end of the centering head. Within each of these grooves is slidably mounted a jaw 132 whose outer edge 133 is rounded and always maintains a position parallel to the axis of the head. The inner end of each jaw is provided with a hook 134 which is received within an annular channel 135 provided in the end of the sleeve 125. The interaction of this hook and channel restrains the movements of the jaws to radial directions only. Beyond the end of the sleeve 125, the jaws are prevented from separating from their respective grooves by means of an endless coil spring 136 which encircles the jaws and is received within a suitable groove 137 provided in each of them. The left end of the head, as viewed in Fig. 16 is provided with a reduced portion 138 which is intended to be inserted in the chuck part of the boring spindle.

The operation of centering and reboring the piston pin hole of the piston will now be described, it being assumed, for purpose of description, that the piston holding fixture as illustrated in Fig. 2, is employed.

The piston holding fixture will first be secured to the table 83, after which the centering head 124 is placed in the outboard bearing and moved towards the right and through the piston pin hole of the piston, it being assumed that the jaws 132 of the head are in a retracted position to permit of this insertion. The centering head adjusting screw is then rotated to move the jaws 132 into firm, but not too tight, contact with the surface of the pin hole. It should be understood that, before these jaws are outwardly adjusted, that the end of the centering head has been moved toward the right sufficiently to insert the reduced portion 138 thereof within the chuck part of the boring spindle, so that both ends of the centering head are fully supported and with the axes of the head and boring spindle accurately aligned with each other.

The piston being thus centered, the work table 83 is moved upwardly until the plate 91 contacts with the bottom edge of the piston, and the table is then locked in position, after which the upper clamp 99 is moved downwardly to engage the head of the piston. The centering head may then be withdrawn, after first retracting the jaws 132. The piston is then in position for the boring operation.

The boring bar having been set to the proper size and the piston being held in centered position, the piston pin holes thereof may now be rebored. In carrying out this operation, a bushing sleeve 159 is mounted in the bore 82 in the outboard bearing and the boring bar inserted through this bushing, the latter serving as a journal for the bar. The driven end of the boring bar is provided with a bayonet slot 160 (see Fig. 15) which is inserted in the chuck part 61 provided on the end of the boring spindle (see Fig. 13), and the walls of the slot 160 establish a driving connection with the set screw 64. At this time, the relation of the cutting blade on the boring bar to the piston pin holes is substantially as indicated in Fig. 6. The hand knob 55 on the feed control shaft 40 will then be turned to establish the driving connection between the shafts 35 and 26, whereupon the sleeve 49 will be drawn towards the right, as viewed in Fig. 2, while the boring spindle 26 is being rotated. The cutting blade 155 therefore bores the piston pin holes to the new diameter and when the sleeve 49 has moved inwardly in the bore 25 a sufficient distance, it contacts with the end of the rock arm 77 and automatically throws the motor out of operation.

In Figs. 23 to 30, inclusive, is illustrated one modification of a connecting rod holding fixture which is also adapted for support on and securement to the work table 83, and is intended to support the piston pin end of a connecting rod with the axis of its previously bored pin hole in precise alignment with the axis of the boring spindle.

This connecting rod fixture includes a base plate 161 which is secured to the work table 83 by means of cap screws 162 and resting on the top surface of this plate is a block 163. This block may be more or less square in plan outline and in any case is preferably located to one side of the boring spindle axis for a purpose presently explained. A parti-cylindrical cavity 164 is provided in the block 163 and this cavity is offset in a direction away from the end face of the boring head such that the cavity forms an opening in the adjacent side face 165 of the block. As viewed in Fig. 23, therefore, the block 163 has generally the appearance of a reversed letter C and the cavity is sufficiently large to insure that the top portion of the block will be slightly flexible in order to clamp a part that is received within the cavity, as presently described.

This part is in the form of a body 166 which fits in the cavity and which projects beyond the edge of the block across the plate 161 for a predetermined distance and preferably beyond the axis of the boring spindle. The exposed portion of the body 166 through the opening has affixed thereto a clamp plate 167 which is intended to grip one side of the shank of a connecting rod 168, preferably a shank having an "I-section".

Referring to Fig. 28, the portion of the body 166 within the block 163 is provided with a hole 169 that extends therethrough and which is preferably elongated in cross section, as clearly shown in Fig. 27. A stud 170 extends through the hole 169 and has its lower end fixedly mounted in the plate 161, while the upper end thereof extends through the block 163 and has mounted thereon a clamp nut 170ª, whereby the body 166 may be clamped in any position to which it is rocked, while, at the same time, the block 163 is held in any position to which it may be swung.

By referring to Fig. 26, it will be seen that the body 166 is provided with a pair of pins 171 which, when the fixture is in the position shown in Figs. 23 and 26, will be located on opposite sides of the axis of the boring spindle, or, in other words, on opposite sides of the shank of the connecting rod. Each of the ends is provided with one or more reduced portions 172 for receiving the slotted ends of a bridge bar 173 which corresponds generally to the bridge bar hereinbefore described. A clamp screw 174 is threaded through the central portion of the bar 173 and its inner end is ball-shaped as at 175 for reception within a correspondingly formed socket provided in a clamp head 176. The latter head is therefore capacitated for universal movement, as is also the clamp plate 167 by reason of the capacities of the block 163 and the body 166 to swing in directions normal to each other. The elongated hole 169 in the body enables this part to swing without interference with the stem 170.

In using the above-described, connecting rod, holding fixture in conjunction with my improved boring machine, the same is secured to the table 83 in substantially the condition illustrated in Fig. 23, that is, with the bridge bar 173 and the clamp head 176 removed. The centering head 124 is inserted through the outboard bearing and through the pin hole of the connecting rod and the end of the centering head is then inserted in the chuck on the boring spindle. The jaws 132 are then expanded outwardly as before to accurately align the axis of the piston pin hole with the axis of the boring spindle. The table 83 is then moved up to a convenient distance below the centering head and the block 163 and the body 166 are swung and rocked, respectively, as indicated by dotted lines in Figs. 27 and 28, in order to establish a good clamping contact of the plate 167 with the adjacent side of the connecting rod shank. The bridge bar 173 and the accompanying clamp head 176 are mounted upon the pins 171 and the clamping screw 174 rotated until the rod shank is fully clamped between the indicated clamping parts. After this result is secured, the clamping nut 170ª is screwed down tightly to hold the block 163 and the body 166 in the indicated positions, respectively. The piston pin hole may then be bored in the same manner as indicated for the boring of the piston.

In Fig. 31 is illustrated in plan view, corresponding to the plan view shown in Fig. 26, a further modification of a connecting rod holding fixture. This fixture is also provided with a base plate corresponding to the plate 161 and mounted on the upper surface thereof is a block 177, substantially identical with the block 163, and rockable within the cavity in this block is a body 178 that is similar in construction to the body 166. As in the preceding construction the block 177 and the body 178 are held in adjusted position by a clamping nut 179 that is fitted on a stem 180, corresponding to the stud 170. A clamp plate 181 is secured to the body 178 beyond the block 177 by means of a cap screw 182 which passes through an offset arm provided on the plate.

A pair of studs 183 and 184 are mounted in and extend outwardly from the body 178, stud 183 being preferably located closer to the clamp plate 181. A clamp plate 185 is freely slidable upon the stud 183 and is inwardly beveled around the stud to provide a surface 186 that is intended to contact a similarly shaped surface 187 provided on a jam nut 188 that is threaded on the stud. The clamp plate 185 is extended and is also freely slidable on the stud 184. Between the plate 185 and the block 177, a fulcrum nut 189 is threaded on the stud 184.

Because of the similarity in construction, the clamp 181 is capable of a universal movement, for reasons noted above, while the loose mounting of the clamp plate 185 also enables it to be adjusted for a good clamping action on the adjacent side of the rod shank. In the use of this fixture, the connecting rod having been mounted on the centering head, it is slipped along this head until the shank thereof contacts with the clamping plate 181. Thereupon, the fulcrum nut 189 is moved to the position generally indicated by dotted lines in Fig. 31, or generally in a position such that when the clamp plate 185 is moved towards the rod shank, it will be forced into clamping engagement with the shank by the jam nut 187 operating against the nut 189 as a fulcrum.

The connecting rod holding fixtures heretofore described are provided with clamping plates whose surfaces are more particularly designed for engaging rod shanks having an I-section. In Fig. 32 is illustrated in plan view a clamping plate 190 that could be substituted for the clamping plate 181 and which is provided with a channel-shaped groove 191 whose side walls merge into outwardly flaring or directed surfaces 192. The provision of the channel 191 is particularly useful for clamping the rod shank 193 which is cross-shaped in cross section, while the surfaces 192 accommodate themselves readily to a rod shank 194 which is circular in cross section.

In Fig. 33 is illustrated a clamp plate 195 corresponding to the plate 167 and which therefore may be employed in connection with the holding fixture illustrated in Fig. 23. The plate 195 is also provided with a channel groove 196 and flaring surfaces 197 for reasons noted in connection with the clamp shown in Fig. 32.

I claim:

1. In a machine for reboring a hole in a previously bored part, the combination of a work head having an end face and a bearing normal to the end face, a bracket secured to the end face and including a bearing in axial alignment with the work head bearing, a spindle reciprocably journaled in the work head bearing and having one end adapted to extend beyond the end face, the spindle end having a cylindrical pocket whose axis is aligned with the spindle axis, a centering device having its ends journaled in the bracket bearing and pocket and its intermediate portion extending through the hole of the part to be rebored, the portion having parts engageable with the wall of the hole for substantially the length thereof to axially align the hole with the axes of both bearings, and a work holder adjustable along the end face for clamping the part in the aligned position.

2. In a machine for reboring a hole in a previously bored part, the combination of a work head having an end face and a bearing normal to the end face, a bracket secured to the end face and including a bearing in axial alignment with the work head bearing, a spindle reciprocably journaled in the work head bearing and having one end adapted to extend beyond the end face, the spindle end having a cylindrical pocket whose axis is aligned with the spindle axis, a centering device having its ends journaled in the bracket bearing and pocket and its intermediate portion extending through the hole of the part to be rebored, a plurality of radially movable jaws mounted in the intermediate portion with each jaw having a length not less than the length of the hole, means for shifting the jaws into contact with the wall of the hole to axially align the same with the axes of both bearings, and a work holder adjustable along the end face for clamping the part in the aligned position.

3. In a machine for reboring the piston pin holes of a piston, the combination of a work head having an end face and a bearing normal to the end face, a bracket secured to the end face and including a bearing in axial alignment with the work head bearing, a spindle reciprocably journaled in the work head bearing and having one end adapted to extend beyond the end face, the spindle end having a cylindrical pocket whose axis is aligned with the spondle axis, a centering device having its ends journaled in the bracket bearing and pocket and its intermediate portion extending through the piston pin holes, the portion having parts engageable with the walls of the holes for substantially the length of each to axially align the holes with the axes of both bearings, and a work holder adjustable along the end face comprising a base for contacting the bottom of the piston and a clamp adjustable to engage the top of the piston.

4. In a machine for reboring the hole in a previously bored part, the combination of a work head having an end face and a bearing normal to the end face, a bracket secured to the end face and including a bearing in axial alignment with the work head bearing, a spindle reciprocably journaled in the work head bearing and having one end adapted to extend beyond the end face, the spindle end having a cylindrical pocket whose axis is aligned with the spindle axis, a centering device having its ends journaled in the bracket bearing and pocket and its intermediate portion extending through the hole of the part to be rebored, the portion having parts engageable with the wall of the hole for substantially the length thereof to axially align the hole with the axes of both bearings, and a work holder adjustable along the end face for securing the part in the aligned position comprising a base for engaging a portion of the part, uprights mounted on the base, and an adjustable clamp bridged between the uprights engageable with another portion of the part.

5. In a machine for reboring the piston pin holes of a piston, the combination of a work head having an end face and a bearing substantially normal to the end face, a bracket secured to the end face and including a bearing in axial alignment with the work head bearing, a spindle reciprocably journaled in the work head bearing and having one end adapted to extend beyond the end face, the spindle end having a cylindrical pocket whose axis is aligned with the spindle axis, a centering device having its ends journaled in the bracket bearing and pocket and its intermediate portion extending through the piston pin holes, the portion having parts engageable with the walls of the holes for substantially the length of each to axially align the holes with the axes of both bearings, and a work holder adjustable along the end face having a pair of rockable clamps for engaging the top and bottom of the piston, respectively, to hold the same in the aligned position.

HERMAN W. ZIMMERMAN.